United States Patent
Gresset

(10) Patent No.: US 10,110,347 B2
(45) Date of Patent: Oct. 23, 2018

(54) METHOD FOR COMPUTING LIKELIHOODS IN PROCESS FOR RECONSTRUCTING DECODED INFORMATION WORDS

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/577,612

(22) PCT Filed: Jun. 15, 2016

(86) PCT No.: PCT/JP2016/068447
§ 371 (c)(1),
(2) Date: Nov. 28, 2017

(87) PCT Pub. No.: WO2016/204304
PCT Pub. Date: Dec. 22, 2016

(65) Prior Publication Data
US 2018/0139010 A1    May 17, 2018

(30) Foreign Application Priority Data
Jun. 16, 2015  (EP) .................................. 15172285

(51) Int. Cl.
*H04L 1/08*       (2006.01)
*H04L 1/00*       (2006.01)
(Continued)

(52) U.S. Cl.
CPC ............ *H04L 1/0054* (2013.01); *H04L 1/005* (2013.01); *H04L 1/0065* (2013.01);
(Continued)

(58) Field of Classification Search
CPC ..... H04L 1/0054; H04L 1/0643; H04L 27/34; H04L 1/0668; H04L 1/005; H04L 1/0071
See application file for complete search history.

(56) References Cited

U.S. PATENT DOCUMENTS

| | | | | |
|---|---|---|---|---|
| 7,680,211 B1* | 3/2010 | von der Embse | .... | H04L 1/0071 375/130 |
| 2005/0111592 A1* | 5/2005 | Yee | ........................ | H04L 1/0048 375/341 |
| 2011/0058632 A1* | 3/2011 | Siti | .......................... | H04L 1/06 375/340 |

FOREIGN PATENT DOCUMENTS

WO    WO 2006/032287 A1    3/2006

OTHER PUBLICATIONS

Hwang et al. "Differential Space Time Block Codes Using Nonconstant Modulus Constellations", IEEE Transactions on Signal Processing, vol. 51, No. 11, Nov. 2003, pp. 2955-2964.
(Continued)

*Primary Examiner* — Dac Ha
(74) *Attorney, Agent, or Firm* — Birch, Stewart, Kolasch & Birch, LLP

(57) ABSTRACT

Method for computing likelihoods in a process for reconstructing decoded information words from vectors of observations received from a wireless channel and generated from vectors of transmission symbols using a plurality of Alamouti matrix based Differential Space Time Block Codes coder. The method comprises applying an iterative reconstruction process, comprising, in a current iteration: receiving a vector of observations; determining, at least one vector of approximated scaling factors to be applied to the vector of observations; determining for each vector of approximated scaling factors a vector of approximated scaled equivalent channel models; and, computing likelihoods in the form of values representative of joint probabilities of
(Continued)

obtaining the vector of observations knowing a vector of modulated symbols and a model of the wireless channel using each determined vector of approximated scaling factors and each determined vector of approximated scaled equivalent channel models.

16 Claims, 5 Drawing Sheets

(51) Int. Cl.
    *H04L 1/06*     (2006.01)
    *H04L 25/06*     (2006.01)
    *H04L 27/34*     (2006.01)

(52) U.S. Cl.
    CPC .......... *H04L 1/0071* (2013.01); *H04L 1/0606* (2013.01); *H04L 1/0618* (2013.01); *H04L 1/0631* (2013.01); *H04L 1/0643* (2013.01); *H04L 1/0668* (2013.01); *H04L 25/067* (2013.01); *H04L 27/34* (2013.01)

(56) References Cited

OTHER PUBLICATIONS

Hwang et al. "Differential Space Time Block Codes using QAM Constellations", the 14th IEEE 2003 International Symposium on Personal, Indoor and Mobile Radio Communication Proceedings, pp. 1693-1697.

Nam et al. "Differential Space Time Block Codes using QAM for Four Transmit Antennas", 2004 IEEE Communications Society, pp. 952-956.

Xu et al. "Multiple-Symbol Differential Sphere Detection Aided Differential Space-Time Block Codes Using QAM Constellations", IEEE Signal Processing Letters, vol. 18, No. 9, Sep. 2011, pp. 497-500.

* cited by examiner

METHOD FOR COMPUTING LIKELIHOODS IN PROCESS FOR RECONSTRUCTING DECODED INFORMATION WORDS

TECHNICAL FIELD

The invention concerns a method for computing likelihoods in a process for reconstructing decoded information words from a signal received on a receiver device in the form of vectors of observations after transmission of said signal using sub-channels of a wireless channel, and a device for implementing the method.

BACKGROUND ART

In telecommunications, diversity is a property often searched for improving a reliability of a signal transmission. This is particularly true in wireless communications where a signal transmission is affected by fading, co-channel interference, thermal noise and/or error bursts. Communication schemes providing diversity, called diversity schemes in the following, are based on the assumption that individual communication channels experience different impairments. Several copies of a same signal may be therefore transmitted on and/or received from a plurality of communication channels, hoping that each copy is differently affected by the communication channel impairments. One objective is to obtain on a receiver side, by a combination of the received copies, a good reconstruction of information words comprised in the transmitted signal.

The telecommunication literature is rich of several types of diversity schemes. We can mention for instance:

Diversity schemes based on time diversity in which multiple versions of a same signal are transmitted at different time instants.

Diversity schemes based on frequency diversity in which a signal is transmitted using several frequencies or spread over a wide spectrum that is affected by frequency-selective fading.

Diversity schemes based on space diversity in which a signal is transmitted over several different propagation paths. In the case of wireless transmission, it can be achieved by antenna diversity using multiple transmitter antennas (transmit diversity) and/or multiple receiving antennas (reception diversity), or both.

Diversity schemes based on polarization diversity in which multiple versions of a signal are transmitted and received via antennas with different polarization.

Space Time Codes (STC) (respectively Space Frequency Codes (SFC)) are examples of diversity schemes offering jointly spatial and temporal diversity (resp. spatial and frequency diversity) in which reliability of wireless transmission is improved by using a plurality of transmit antennas.

An evolution of STC (resp. SFC) codes are the Space Time Block Codes (STBC) (resp. Space Frequency Block Codes (SFBC)) in which a data stream to be transmitted is encoded in blocks, which are distributed among spaced antennas and across time (resp. across frequencies).

An STBC (resp. SFBC) code is usually represented by a matrix.

$$\begin{pmatrix} S_{11} & \cdots & S_{1K} \\ \vdots & \ddots & \vdots \\ S_{L1} & \cdots & S_{LK} \end{pmatrix}$$

where the $S_{ij}$ ($i \in [1; L]$, $j \in [1; K]$) are linear combination of symbols to be transmitted on a time slot i (resp. on a frequency i) from antenna j.

A popular STBC code adapted to transmission devices having two transmit antennas (or an even number of transmit antennas) and an arbitrary number of receive antennas was proposed by Siavash Alamouti et al. in the document "*Space-time codes for high data rate wireless communication: Performance analysis and code construction./IEEE Transactions on Information Theory* 44 (2): 744-765 " with the following 2×2 matrix:

$$Q(x) = \begin{bmatrix} S_{11} & S_{12} \\ S_{21} & S_{22} \end{bmatrix} = \begin{bmatrix} x_1 & x_2 \\ -x_2^* & x_1^* \end{bmatrix}$$

where * denotes complex conjugate.

The matrix of Alamouti (or Alamouti Matrix) generates four output symbols $x_1$, $x_2$, $-x_2^*$, and $x_1^*$, from two input symbols $x_1$ and $x_2$, $x_1$ being transmitted on a first time slot (resp. on a first frequency) and a first antenna, $x_2$ being transmitted on the first time slot (resp. on the first frequency) and a second antenna, $-x_2^*$ being transmitted on a second time slot (resp. on a second frequency) and the first antenna, $x_1^*$ being transmitted on the second time slot (resp. on the second frequency) and the second antenna.

A further evolution of STBC codes (resp. SFBC codes) are Differential Space Time Block Codes (DSTBC) (resp. Space Frequency Block Codes (DSFBC)). DSTBC codes (resp. DSFBC codes) involve a differential encoding of symbols. The differential encoding allows, at a receiver, to avoid an estimation of phases of channel coefficients. This is particularly interesting when a channel has a small coherence time with respect to a time symbol period.

Even if generalizations of the STC (resp. SFC) codes based on the Alamouti matrix exist in the literature with larger matrices adapted to more than two antennas and more than two time slots (resp. more than two frequencies), the original 2×2 matrix of Alamouti remains commonly used. This matrix limits the number of symbols that can be inputted to the STC (STBC or DSTBC) (resp. SFC (SFBC or DSFBC)) coder to two symbols at a time.

Since, generally, inputs of a communication system are not symbols, but vectors of symbols, a plurality of STC (resp. SFC) coders based on the Alamouti 2×2 matrix (called Alamouti STC (resp. SFC) coders in the following) are parallelized to encode each vector. For instance, with vectors of symbols of size m, a set of m/2 Alamouti STC (resp. SFC) coders are used to encode the symbols of each vector of symbols.

Generally the symbols of each vector of symbols are interleaved by an interleaving module positioned before the set of STC (respectively SFC) coders, which creates a first level of diversity by dispatching the symbols on different time or frequency resources associated with different impairments.

Linear pre-coding is another method that can be used to increase the (time, frequency and/or in space) diversity in a transmitted signal in systems with a small number of antennas. A linear pre-coder, based for instance on cyclotomic rotations, creates linear combinations of n input symbols and spreads m output symbols resulting from the linear combinations over different transmission resources. Such linear pre-coder can achieve a diversity increase by a factor n.

Linear pre-coding can also be used for other purposes, for instance to decrease a PAPR (Peak-to-Average Power Ratio) of an OFDM (Orthogonal frequency-division multiplexing) modulation by using a Discrete Fourier Transform (DFT) before mapping the so pre-coded symbols on the sub-carriers of the OFDM modulation, or to apply a multi-user interference mitigation technique by using the spatial dimensionality of a multi-user MIMO (Multiple Input Multiple Output) system.

Known transmission devices comprise an interleaving module and a module comprising a set of parallel STC (resp. SFC) coders. In the following, a module combining an interleaving module and a module comprising a set of parallel STC (resp. SFC) coders (called signal encoding module in the following) is called a diversity creation module. A diversity creation module can also comprise a linear pre-coding (LPC) module positioned before the interleaving module and the signal encoding module. The diversity creation module benefits of properties brought by the modules constituting it.

For instance a diversity creation module can benefit of a first level of diversity brought by an LPC module, a second level of diversity brought by an interleaving module and a third level of diversity brought by a signal encoding module.

In a transmission device, as already mentioned, a diversity creation module receives generally vectors of symbols in which symbols are modulated symbols generated by a modulation module such as, for example, a Bit Interleaved Coded Modulation (BICM) module, from information words. The diversity creation module then generates tuples of transmission symbols from the vector of modulated symbols. In the case of parallel Alamouti STC (resp. SFC) coders, each Alamouti STC (resp. SFC) coder generates a quadruple of transmission symbols from a pair of input symbols representative of the modulated symbols. Indeed, when the signal encoding module is preceded only by the interleaving module, the symbols representative of the modulated symbols are the modulated symbols themselves, while when the signal encoding module is preceded by an LPC module and an interleaving module, the symbols representative of the modulated symbols are combined symbols resulting from the linear combination performed by the LPC module.

Each transmission symbol is transmitted on an associated transmission channel different for each transmission symbol. Each transmission channel is provided by a dedicated transmission resource. A transmission resource is generally defined by an antenna of a plurality of antennas available on the transmission device, a time slot (resp. a frequency) of a set of pre-defined time slots (resp. pre-defined frequencies) and a sub-carrier of a set of pre-defined sub-carriers. The selection of the antenna and the time-slot (resp. the frequency) allocated to a transmission symbol is fixed by the 2×2 Alamouti matrix. A different sub-carrier is then allocated to each Alamouti STC coder. In the case of SFC coders, a different set of sub-carriers is then allocated to each Alamouti SFC coder.

On a receiver device, a transmitted signal is received in the form of vectors of observations. Each observation corresponds to a transmission symbol impacted by the associated transmission channel and affected by a noise corresponding to the associated transmission channel. The receiver device comprises an inverse diversity creation module which corresponds to the diversity creation module of the transmission device.

The inverse diversity creation module comprises a signal decoding module comprising inverse STC (resp. SFC) modules corresponding to the STC (resp. SFC) coders comprised in the signal encoding module of the transmission device. The inverse diversity creation module is able to generate a vector of processed observations from a vector of observations. Each processed observation of a vector of processed observations corresponds to a modulated symbol of a vector of modulated symbols processed by the diversity creation module.

One objective of the receiver device is to reconstruct decoded information words as close as possible to information words transmitted into the vector of transmission symbols. Many receiver devices use a reconstruction process based on computations of likelihood.

SUMMARY OF INVENTION

Technical Problem

The computation of likelihoods is an important issue in communication systems comprising DSTC (or DSTBC) (resp. DSFC (or DSFBC)) coders. Indeed, in such communication systems, the computation of optimal likelihoods on the receiver device requires a knowledge of information representative of the vectors of modulated symbols or of the information words transmitted by the transmission device, whereas these information are not available on the receiver device.

Solutions exist to deal with this issue but these solutions induce error propagation, latency in the reconstruction process and therefore a reconstruction process having a high computation complexity.

Solution to Problem

It is desirable to overcome the above drawbacks.

It is particularly desirable to design a reconstruction process avoiding error propagation and latencies. It is also particularly desirable to design a reconstruction process having a reasonable complexity According to a first aspect of the invention, the invention concerns a method for computing likelihoods in a process for reconstructing decoded information words from a signal received on a receiver device in the form of vectors of observations after transmission of said signal using sub-channels of a wireless channel by a transmission device in the form of vectors derived from vectors of modulated symbols, said signal having been generated using a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, the receiver device comprising at least one reception antenna, a signal decoding module, a scaling module adapted to scale observations of a vector of observations after processing by the signal decoding module to obtain a vector of scaled observations and a de-interleaving module applying a de-interleaving to the vector of scaled observations, the signal decoding module comprising elementary decoding modules, each elementary decoding module being an inverse DSTBC or inverse DSFBC module, characterized in that the method comprises applying an iterative reconstruction process, comprising in a current iteration: receiving a vector of observations on each antenna, each vector of observations corresponding to a same vector of modulated symbols; determining, for each vector of observations, at least one corresponding vector of approximated scaling factors; determining for each vector of approximated scaling factors corresponding to each vector of observations, a vector of approximated scaled equivalent channel models; and, computing likelihoods in the form of values representative of joint probabilities of obtaining each vector of observations knowing a vector of modulated symbols and a model of the wireless channel using each determined vector of approximated scaling factors and each determined vector of approximated scaled equivalent channel models; wherein the determining, of one vector of approximated scaled equivalent channel models, comprises, for each elementary decoding module, the sub steps of computing a norm, called first norm, of a couple of observations of a preceding vector of observations received on the same antenna than said vector of observations in an iteration preceding the current iteration, said couple of observations corresponding to the elementary decoding module; obtaining an approximated scaling factor of the vector of approximated scaling factors corresponding to the elementary decoding module; and, computing an approximated scaled equivalent channel model as a product of said approximated scaling factor, said first norm, a norm of channel coefficients of the model of the wireless channel corresponding to said elementary decoding module and a first predetermined parameter corresponding to said elementary decoding module.

The approximated scaled equivalent channel model used in the computation of the likelihoods doesn't require a knowledge of information representative of the vectors of modulated symbols or of the information words transmitted by the transmission device in the iteration preceding the current iteration. Consequently, there is no risk of error propagation and no risk to introduce latencies in the reconstruction process.

In an embodiment, each vectors derived from vectors of modulated symbols is a vector of transmission symbols and each transmission symbol of the vector of transmission symbols is transmitted on a different sub-channel of the wireless channel.

The transmission on different sub-channel allows creating diversity in the received observations.

In an embodiment, said signal have been generated using also an interleaving module positioned before the plurality of elementary coding modules and interleaving a vector of modulated symbols to generate a vector of interleaved symbols provided to the plurality of elementary coding modules, the de-interleaving applied by the de-interleaving module corresponding to the interleaving performed by the interleaving module.

Using an interleaving module allows increasing the diversity.

In an embodiment, the vector of scaled observations obtained by the scaling module comprises scaled observations with equal noise variance.

Receiving observations with equal noise variance facilitates the reconstruction process.

In an embodiment, a vector of scaled observations is obtained by the scaling module for each vector of approximated scaling factors.

In an embodiment, each vector of approximated scaled equivalent channel models is representative of an approximation of the model of the wireless channel after processing by the signal decoding module, the scaling module and the de-interleaving module.

In an embodiment, a vector of approximated scaling factors and a vector of approximated scaled equivalent channel models are determined for each possible vector of modulated symbols.

In an embodiment, determining, for a vector of observations, at least one corresponding vector of approximated scaling factors comprises, for an elementary decoding module: computing a norm, called second norm, of a couple of observations of said vector of observations corresponding to the elementary decoding module; computing one approximated scaling factor, called single approximated scaling factor, as a division of the value one by a square root of a sum of a first element and a second element, the first element being a product of a square of second predetermined parameter corresponding to said elementary decoding module and a square of the second norm and the second element being a square of the first norm.

The vectors of approximated scaling factors used in the computation of the likelihoods doesn't require a knowledge of information representative of the vectors of modulated symbols or of the information words transmitted by the transmission device in the current iteration. Consequently, the complexity of the reconstruction process is reduced.

In an embodiment, the approximated scaling factor used when computing the approximated scaled equivalent channel model as a product of said approximated scaling factor, said first norm, said norm of channel coefficients of the model of the wireless channel and said first predetermined parameter, is the single approximated scaling factor.

Consequently, the complexity of the reconstruction process is reduced.

In an embodiment, each predetermined parameter corresponding to said elementary decoding module is computed in function of the couple of observations of the preceding vector of observations corresponding to said elementary decoding module.

The predetermined parameters depend only on couples of observations of the preceding vector of observations that are available on the receiver device.

In an embodiment, each predetermined parameter corresponding to said elementary decoding module is computed in function of the couple of observations of the preceding vector of observations corresponding to said elementary decoding module with an asymptotic assumption that the first norm is much higher than a norm of a noise associated with the channel coefficients of the channel model corresponding to said elementary decoding module.

In an embodiment, the first predetermined parameter corresponding to said elementary decoding module is fixed to the value "1".

In an embodiment, the second predetermined parameter corresponding to said elementary decoding module is fixed to the value "−1".

According to a second aspect of the invention, the invention concerns a receiver device for computing likelihoods in a process for reconstructing decoded information words from a signal received in the form of vectors of observations after transmission of said signal using sub-channels of a wireless channel by a transmission device in the form of vectors derived from vectors of modulated symbols, said signal having been generated using a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, said receiver device comprising at least one reception antenna, a signal decoding module, a scaling module adapted to scale observations of a vector of observations after processing by the signal decoding module to obtain a vector of scaled observations and a de-interleaving module adapted to apply a de-interleaving to the vector of scaled observations, the signal decoding module comprising elementary decoding modules, each elementary decoding module being an inverse DSTBC or inverse DSFBC module, characterized in that the receiver device comprises means for applying an iterative reconstruction process adapted to: receive a vector of observations on each antenna, each vector of observations corresponding to a same vector of modulated symbols; determine, for each vector of observations, at least one corresponding vector of approximated scaling factors; determine for each vector of approximated scaling factors corresponding to each vector of observations, a vector of approximated scaled equivalent channel models; and, compute likelihoods in the form of values representative of joint probabilities of obtaining each vector of observations knowing a vector of modulated symbols and a model of the wireless channel using each determined vector of approximated scaling factors and each determined vector of approximated scaled equivalent channel models; wherein for determining one vector of approximated scaled equivalent channel models, the iterative reconstruction process is adapted to: compute a norm, called first norm, of a couple of observations of a preceding vector of observations received on the same antenna than said vector of observations in an iteration preceding the current iteration, said couple of observations corresponding to an elementary decoding module; obtain an approximated scaling factor of the vector of approximated scaling factors corresponding to said elementary decoding module; and, compute an approximated scaled equivalent channel model as a product of said approximated scaling factor, said first norm, a norm of channel coefficients of the model of the wireless channel corresponding to said elementary decoding module and a first predetermined parameter corresponding to said elementary decoding module.

According to a third embodiment of the invention, the invention concerns a system of communication comprising a transmission device adapted to transmit a signal on a wireless channel in the form of vectors of transmission symbols derived from vectors of modulation symbols, said transmission device comprising a diversity creation module comprising an interleaving module and a signal encoding module comprising a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, each transmission symbol of the vector of transmission symbols having been transmitted on a different subchannel of the wireless channel and a receiver device according to the first embodiment.

According to a fourth embodiment of the invention, the invention concerns a computer program comprising program code instructions which can be loaded in a programmable device for implementing the method according to the first embodiment, when the program code instructions are run by the programmable device.

According to a fifth embodiment of the invention, the invention concerns information storage means storing a computer program comprising program code instructions which can be loaded in a programmable device for implementing the method according to the first embodiment, when the program code instructions are run by the programmable device.

The characteristics of the present invention mentioned above, as well as other characteristics will appear more clearly on reading the following description of an example of an embodiment, said description being done in relation with the joint drawings.

DESCRIPTION OF EMBODIMENTS

Figure 1:
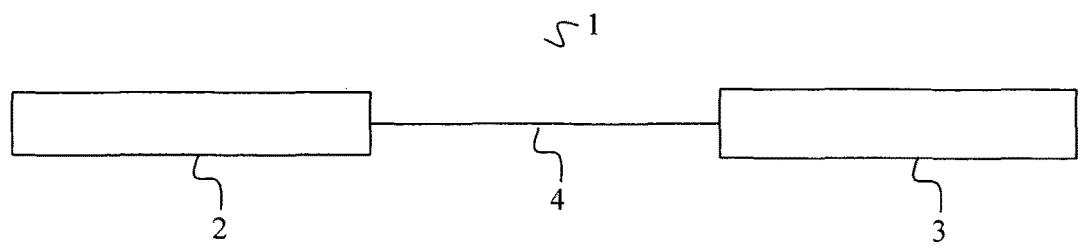
FIG. 1 illustrates schematically an example of a communication system in which the invention can be implemented.

FIG. 1 illustrates schematically an example of a communication system 1 in which the invention can be implemented.

The communication system 1 comprises a transmission device 2 and a receiver device 3 communicating using a wireless channel 4 for instance in the 60 GHz radio band. The communication system 1 applies an iterative transmission process. Each iteration of the iterative transmission process is represented by a variable k. The input of the transmission process at iteration k is a vector of information bits $w_k$ and the output of the transmission process at iteration k is a vector of reconstructed information bits $\hat{w}_k$.

Figure 2A:
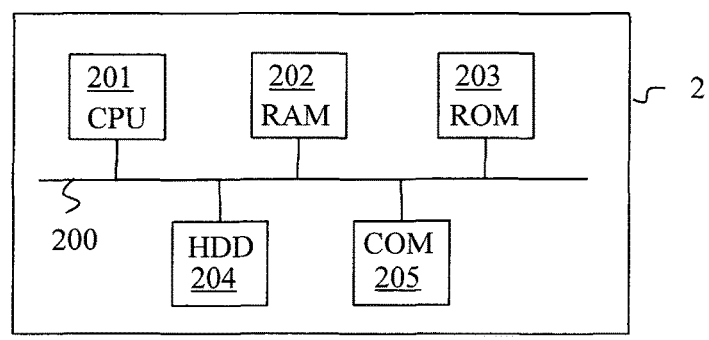
FIG. 2A illustrates schematically an example of a hardware architecture of a transmission device comprised in the communication system.

FIG. 2A illustrates schematically an example of a hardware architecture of the transmission device 2 comprised in the communication system 1.

According to the shown architecture, the transmission device 2 comprises the following components interconnected by a communication bus 200: a processor, microprocessor, microcontroller or CPU (Central Processing Unit) 201; a RAM (Random-Access Memory) 202; a ROM (Read-Only Memory) 203; storage means such as a HDD (Hard-Disk Drive) 204, or any other device adapted to read information stored by storage means; and a communication interface 205.

The communication interface 205 allows the transmission device 2 to receive information words from an application layer device (layer is to be understood here as a layer of the OSI model defining a communication system) and to transmit a corresponding signal to the receiver device 3 using the wireless communication channel 4. In the example of a hardware architecture of the transmission device 2, the communication interface 205 comprises two emission antennas.

CPU 201 is capable of executing instructions loaded into RAM 202 from ROM 203 or from an external memory, such as an SD card or the HDD 204. After the transmission device 2 has been powered on, CPU 201 is capable of reading instructions from RAM 202 and executing these instructions. The instructions form one computer program that causes CPU 201 to perform the generation of a transmission signal in the form of vectors of transmission symbols from the information words, and the transmission of said transmission signal on the wireless channel 4.

The generation and the transmission of the transmission signal from the information words may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In an embodiment the communication interface 205 comprises an even number of emission antennas.

Figure 2B:
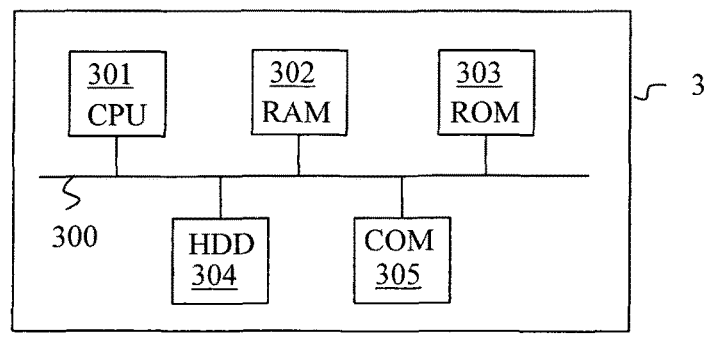
FIG. 2B illustrates schematically an example of a hardware architecture of a receiver device comprised in the communication system.

FIG. 2B illustrates schematically an example of a hardware architecture of the receiver device 3 comprised in the communication system 1.

According to the shown architecture, the receiver device 3 comprises the following components interconnected by a communications bus 300: a processor, microprocessor, microcontroller or CPU (Central Processing Unit) 301; a RAM (Random-Access Memory) 302; a ROM (Read-Only Memory) 303; storage means such as a HDD (Hard-Disk Drive) 304, or any other device adapted to read information stored by storage means; and a communication interface 305.

The communication interface 305 allows the receiver device 3 to receive a signal transmitted on the wireless channel 4 by the transmission device 2 and to provide said signal to a plurality of modules for instance implemented by the processor 301 participating to the reconstruction of decoded information words from the received signal.

The received signal is received in the form of a succession of vectors of observations. In the example of a hardware architecture of the receiver device 3, the communication interface 305 comprises one reception antenna.

In an embodiment, the communication interface 305 comprises more than one reception antenna.

CPU 301 is capable of executing instructions loaded into RAM 302 from ROM 303 or from an external memory, such as an SD card or the HDD 304. After the receiver device 3 has been powered on, CPU 301 is capable of reading instructions from RAM 302 and executing these instructions. The instructions form one computer program that causes CPU 301 to perform the reconstruction of information words from the received signal.

The reconstruction of the information words from the received signal may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3A:
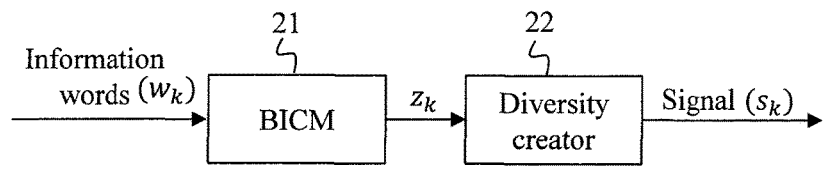
FIG. 3A illustrates schematically an example of transmission device.

FIG. 3A illustrates schematically an example of transmission device.

The transmission device 2 comprises a Bit Interleaved Coded Modulation (BICM) module 21 and a diversity creation module 22. The BICM module 21 receives information words in the form of consecutive vectors of information bits $w_k$. From each vector of information bits $w_k$ the BICM module 21 generates a vector of modulated symbols $z_k$.

The diversity creation module 22 receives the vectors of modulated symbols $z_k$ from the BICM module and generates the signal to be transmitted on the wireless channel 4 in the form of vectors of transmission symbols $s_k$, one vector of transmission symbols $s_k$ corresponding to one vector of modulated symbols $z_k$.

One can note that, each entry of a vector v of size S is noted v(u) with $u \in [1; S]$. For instance an entry of a vector of modulated symbols $z_k$ of size m is noted $z_k(u)$ with $u \in [1; m]$.

Figure 3B:
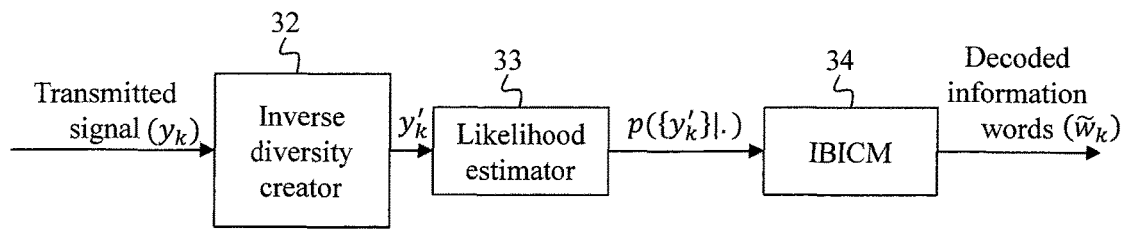
FIG. 3B illustrates schematically an example of receiver device.

FIG. 3B illustrates schematically an example of receiver device.

The receiver device 3 applies a reconstruction process allowing to retrieve decoded information words in the form of vectors of decoded information bits $\tilde{w}_k$ from received observations. The receiver device 3 comprises an inverse diversity creation module 32, a likelihood estimator module 33 and an Inverse Bit Interleaved Coded Modulation (IBICM) module 34.

The inverse diversity creation module 32 receives vectors of observations $y_k$. Each vector of observations $y_k$ corresponds to a vector of transmission symbols $s_k$ impacted by a transmission channel h on which has been transmitted the vector of transmission symbols $s_k$ and affected by a noise $\eta_k$.

The inverse diversity creation module 32 decodes each vector of observations $y'_k$ in order to obtain a vector of processed observations $y'_k$. Each vector of processed observations $y'_k$ is provided to the likelihood estimator module 33 which computes likelihoods in the form of a value representative of a joint probability $p(y_k|z_k, h)$ of obtaining said vector of observations $y_k$ knowing a vector of modulated symbols $z_k$ supposed emitted and a model h of the wireless channel 4 on which was transmitted the vector of transmission symbols $z_k$ corresponding to the vector of modulated symbols $z_k$. In the particular case of the communication system 1, a value representative of a joint probability $p(y_k|z_k, h)$ is given by a joint probabilities $p(y'_k|z_k, \hat{h})$ of obtaining said vector of processed observations $y'_k$ knowing information representative of vectors of modulated symbol (for instance $z_k$) and an equivalent channel $\hat{h}$.

The equivalent channel $\hat{h}$ corresponds to the transmission channel h after decoding by the inverse diversity creation module 32. The likelihoods are then provided to the IBICM module which allows obtaining a vector of decoded information bits $\tilde{w}_k$ for each vector of observations $y_k$.

As can be seen from the above the joint probability $p(y_k|z_k, h)$ or $p(y'_k|z_k, \hat{h})$ depends on the knowledge of the vector of modulated symbols $z_k$ which is not available on the receiver device 3. In the following, we show that a high complexity solution to overcome this issue is to envisage on the receiver device 3, all possible vectors of modulated symbols $z_k$, but solutions with reduced complexity are also possible.

Figure 4A:
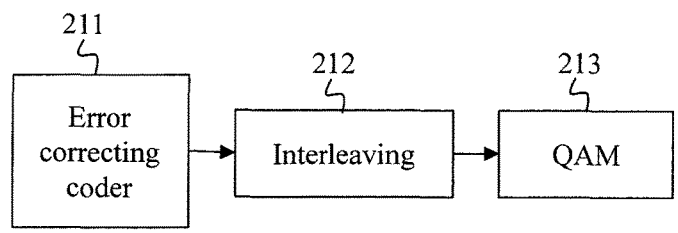
FIG. 4A illustrates schematically an example of Bit Interleaved Coded Modulation (BICM) Module.

FIG. 4A illustrates schematically an example of BICM module.

The BICM module 21 is a concatenation of an error correcting code module 211, an interleaving module 212 and a complex modulation module (e.g. a QAM modulation module). As a consequence, in the example of the BICM module 21 described in relation with FIG. 4A, the outputs of the BICM module 21 are vectors of QAM symbols $z_k$.

The error correcting code module 211 can be any error correcting code allowing hard or soft decoding like, for instance a turbo code.

Figure 4B:
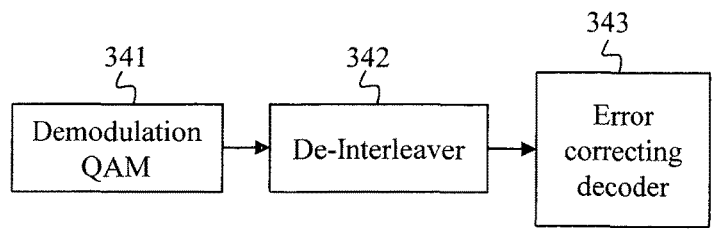
FIG. 4B illustrates schematically an example of Inverse Bit Interleaved Coded Modulation (IBICM) Module.

FIG. 4B illustrates schematically an example of IBICM module.

The IBICM module comprises a demodulation module 341 corresponding to the complex modulation module 213 (i.e. a QAM demodulation module), a de-interleaving module 342 reversing the interleaving performed by the interleaving module 212 and an error correcting decoder module 343 corresponding to the error correcting code module 211. The error correcting decoder module 343 receives the likelihoods provided by the likelihood estimator module 33 and performs a reconstruction of the vectors of decoded information bits $\tilde{w}_k$ based on said likelihoods.

Figure 5:
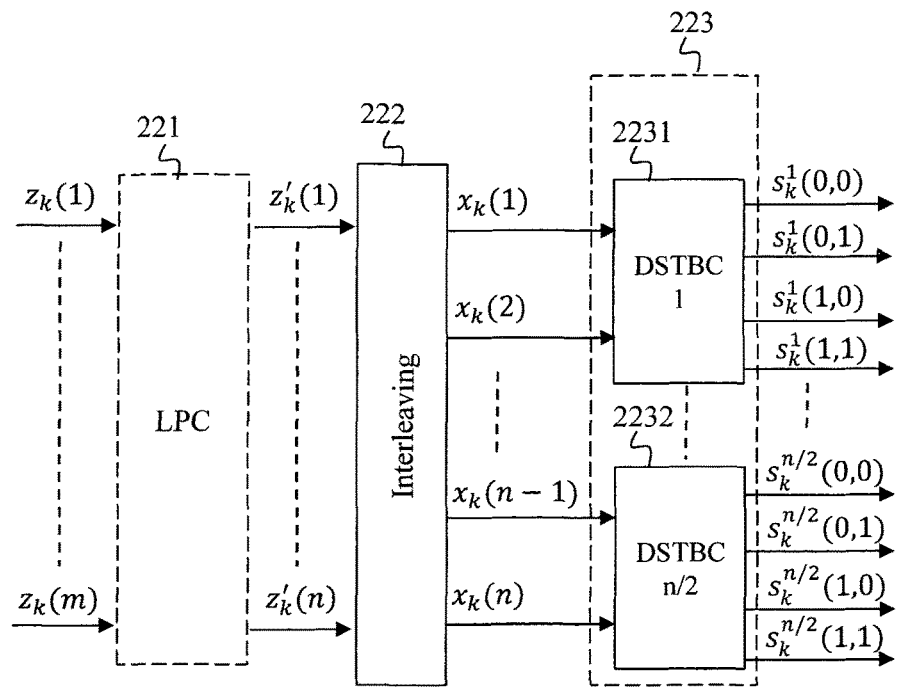
FIG. 5 illustrates schematically an example of diversity creation module.

FIG. 5 illustrates schematically an example of diversity creation module.

FIG. 5 provides a detailed view of diversity creation module 22. The diversity creation module comprises an interleaving module 222, a signal encoding module 223. Optionally, the diversity creation module comprises a LPC coder module 221.

The interleaving module receives vectors $z'_k$ representative of vectors of modulated symbols and generates vectors $x_k$ of interleaved symbols.

In an embodiment, the interleaving module applies the following operation:

$$x_k(\omega(u))=z'_k(\Omega(u))$$

$\Omega(u)$ and $\omega(u)$ defines a one to one mapping between the input of the interleaving module and the output of the interleaving module.

When the diversity creation module 22 doesn't comprise the LPC coder module 221, the vectors $z'_k$ representative of vectors of modulated symbols are equal to the vectors of modulated symbols $z_k$. This case corresponds to having a LPC coder corresponding to an identity matrix.

When the diversity creation module 22 comprises a LPC coder module 221, a vector $z'_k$ representative of a vector of modulated symbols corresponds to the result of a processing by the LPC coder module 221 of a vector of modulated symbols $z_k$. Considering that the processing performed by the LPC coder can be represented by a LPC matrix $\Phi$, it follows:

$$z'_k = \Phi \cdot z_k$$

In an embodiment wherein the diversity creation module comprises the LPC coder 221, the LPC matrix $\Phi$ is a block diagonal matrix:

$$\Phi = \begin{pmatrix} \Phi' & \cdots & 0 \\ \vdots & \ddots & \vdots \\ 0 & \cdots & \Phi' \end{pmatrix}$$

where $\Phi'$ is a n'×n' cyclotomic rotation matrix mixing n' modulated symbols $z_k(u)$ together, assuming that the size m of the vector of modulated symbols $z_k$ is a multiple of n'.

The vector $z'_k$ representative of a vector of modulated symbols is of size n (m≤n).

From a vector $z'_k$ representative of a vector of modulated symbols of size n, the interleaving module generates a vector of interleaved symbols $x_k$ of size n.

Each vector of interleaved symbols $x_k$ is provided to the signal encoding module 223. The signal encoding module 223 is composed of n/2 DSTBC coders based on the Alamouti 2×2 matrix. Each DSTBC coder receives a couple of interleaved symbols. For instance, a first DSTBC coder 2231 receives the interleaved symbols $x_k(1)$ and $x_k(2)$. A $n/2^{th}$ DSTBC coder 2232 receives the interleaved symbols $x_k(n-1)$ and $x_k(n)$.

From each couple of interleaved symbols, each DSTBC coder generates a quadruple of transmission symbols.

A couple of interleaved symbols received by the j-th DSTBC coder of the signal encoding module 223 is noted $x_k^j$ in the following.

A j-th DSTBC coder of the signal encoding module 223 iteratively generates a quadruple $Q(s_k^j)$ from a quadruple $s_{k-1}^j$ obtained by the same j-th DSTBC coder in an iteration k−1 of the transmission process preceding iteration k as follows:

$$Q(s_k^j) = Q(x_k^j) \frac{Q(s_{k-1}^j)}{\|s_{k-1}^j\|} \quad (1)$$

where $s_k^j = Q(s_k^j)[1\ 0]^T$, and where the 2×2 matrix $Q(s_k^j)$ is the Alamouti matrix defining which resource should be used to transmit a transmission symbol of the quadruple of transmission symbols $Q(s_k^j)$. In the case of a given DSTBC coder, a resource is defined by an antenna and a time slot.

We can denote $Q(x)$ as a quaternion with complex matrix representation:

$$Q(x) = \begin{bmatrix} x_1 & -x_2^* \\ x_2 & x_1^* \end{bmatrix}$$

where:

$$Q(x)^\dagger Q(x) = Q(x)Q(x)^\dagger = \|x\|^2 Id$$

where † is the transpose conjugate operator and Id the identity matrix. Furthermore, as already mentioned above:

$$Q(x)\begin{bmatrix} 1 \\ 0 \end{bmatrix} = x$$

It can be noted that a normalization factor $\|s_{k-1}^j\|$ controls the power of the quadruple $Q(s_k^j)$ in the iterative generation of the quadruple $Q(s_k^j)$, such that $\|s_k^j\| = \|x_k^j\|$. Thus, each DSTBC coder's output is normalized in power which leads to a Power Normalized-DSTBC (PN-DSTBC) coders.

As a remark, the quadruple $Q(s_k^j)$ is a quaternion and $Q(s_k^j)/\|x_k^j\|$ is a unitary transformation.

In an embodiment, the initialization of the iterative generation is given by:

$$Q(s_0^j) = Id$$

The signal encoding module 223 generates vectors $s_k$ of transmission symbols of size 2n comprising n/2 quadruple $Q(s_k^j)$.

Each PN-DSTBC coder is associated to a different sub-carrier. Therefore, since the Alamouti matrix of a PN-DSTBC associates each transmission symbol of a quadruple of transmission symbols to a different couple of time slot and antenna, each symbol generated by the signal encoding module 223 is associated to a different sub-channel of the wireless channel 4, a sub-channel being represented by a time slot, an antenna and a sub-carrier.

Each vector of transmission symbols $s_k$ is provided then to the communication interface 205 of the transmission device 2 which transmits each symbol on an associated sub-channel taking into account the resource (i.e. time slot, antenna and sub-carrier) associated with each transmission symbol $s_k(u)$.

We assume here that, on each resource, the sub-channel associated to a symbol experiences a flat fading, i.e. that no inter symbol interference is experienced at the receiver device 3.

In an embodiment wherein the diversity creation module comprises the LPC coder module 221, the LPC matrix $\Phi$ is a block diagonal matrix:

$$\Phi = \begin{pmatrix} \Phi' & \cdots & 0 \\ \vdots & \ddots & \vdots \\ 0 & \cdots & \Phi' \end{pmatrix}$$

and m=n, the LPC coder module comprises two LPC coders, each associated to a LPC cyclotomic rotation matrix $\Phi'$ of size n/2×n/2. In that embodiment, the signal encoding module 223 comprises a set of n/2 parallel PN-DSTBC coders based on the Alamouti 2×2 matrix.

In an embodiment wherein the diversity creation module comprises the LPC coder module 221, the LPC matrix $\Phi$ is a n×n Discrete Fourier Transform (DFT) Matrix.

In an embodiment wherein the diversity creation module comprises the LPC coder module 221, the LPC matrix $\Phi$ is a n×m truncated DFT Matrix wherein only some columns of the n×n DFT Matrix are considered (m≤n).

Figure 6:
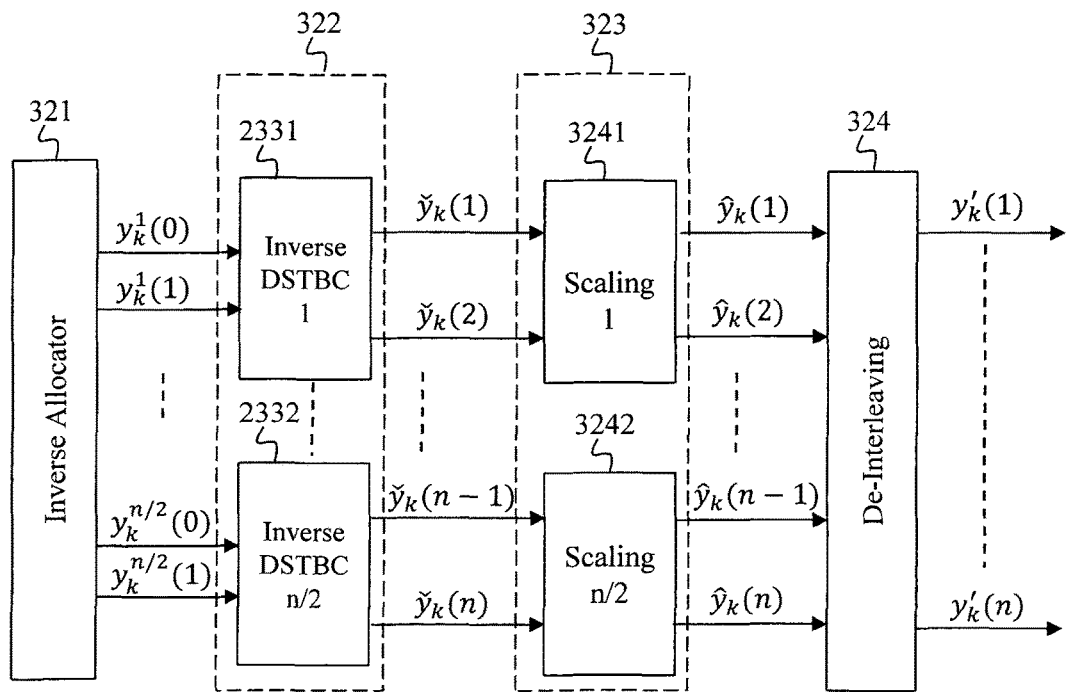
FIG. 6 illustrates schematically an example of Inverse Diversity creation Module according to the invention.

FIG. 6 illustrates schematically a first example of inverse diversity creation module.

FIG. 6 provides a detailed view of the inverse diversity creation module 32.

The inverse diversity creation module 32 comprises a signal decoding module 322, a scaling module 323 and a de-interleaving module 324.

The inverse diversity creation module 32 is adapted to inverse the operations performed by the diversity creation module 22, i.e. the inverse diversity creation module 32 is adapted to regenerate exactly a vector $x_k$ of interleaved symbols from a vector $s_k$ of transmission symbols generated by the diversity creation module 22 from the vector $x_k$ of interleaved symbols.

As already mentioned in relation with FIG. 3B, the inverse diversity creation module 32 receives vectors of observations $y_k$.

Let us call $y_k^j$, a couple of observations of a vector of observations $y_k$ received by the antenna of the communication interface 305 and corresponding to the quadruple $s_k^j$ generated by the j-th PN-DSTBC coder.

The couple $y_k^j$, is linked to the quadruple $s_k^j$ by the following equation of a channel model:

$$y_k^j = Q(s_k^j)h^j + \eta_k^j \quad (2)$$

where $h^j$ represents a sub-channel used to transmit the quadruple $s_k^j$ and $\eta_k^j$ a noise corresponding to said sub-channel $h^j$. We suppose here that each sub-channel $h^j$ is sufficiently static in time so that each sub-channel $h^j$ is independent of iteration k. In addition the two observations of the couple $y_k^j$ are supposed to share the same sub-channel $h^j$. The vector of observations $y_k^j$ is provided to the signal decoding module 322. The signal decoding module 322 comprises n/2 inverse PN-DSTBC module.

The processing of the couple $y_k^j$ by the j-th inverse PN-DSTBC module of the signal decoding module 322 gives a new equation of a channel model $$\check{y}_k^j = Q(y_k^j)Q(y_{k-1}^j)^\dagger [1\ 0]^T = \|h^j\|^2 \|x_{k-1}^j\| x_k^j + \eta_k^{j'}$$

where $\eta_k^{j'}$ is assumed to be a complex Gaussian noise with covariance matrix $(\|x_k^j\|^2\|h^j\|^2 + \|y_{k-1}^j\|^2)$ Id, and $\check{y}_k^j$ is a couple of intermediate observations resulting from the processing of the couple $y_k^j$ by the j-th inverse PN-DSTBC module. We can note here that $h^j$ is supposed to be the same at iteration k and k−1.

The output of the signal decoding module 322 is a vector $\check{y}_k$ of size n of intermediate observations.

The scaling module 323 comprises n/2 elementary scaling modules, each elementary scaling module being associated to an inverse PN-DSTBC module of the signal decoding module 322. For instance, an elementary scaling module 3241 is associated to an inverse PN-DSTBC module 2331 and an elementary scaling module 3242 is associated to an inverse PN-DSTBC 2332. A j-th elementary scaling module applies a scaling to each intermediate observation of the couple of intermediate observations $\check{y}_k^j$ provided by the j-th inverse PN-DSTBC module to obtain a couple of scaled observations $\hat{y}_k^j$. The scaling of the couple of intermediate observations $\check{y}_k^j$ allows obtaining a couple of scaled observations $\hat{y}_k^j$ as follows:

$$\hat{y}_k^j = \gamma_k^j \check{y}_k^j$$

where $\gamma_k^j$ is a scaling factor corresponding to the j-th PN-DSTBC module.

After the scaling by the j-th elementary scaling module, the following equation of a channel model is obtained:

$$\hat{y}_k^j = \hat{h}^j x_k^j + \hat{\eta}_k^j \quad (3)$$

where $\hat{h}^j$ represents a scaled equivalent channel model after processing by the j-th inverse PN-DSTBC module and the j-th elementary scaling module and $\hat{\eta}_k^j$ is assumed to be a complex Gaussian noise with covariance matrix $\gamma_k^{j^2}(\|x_k^j\|^2\|h^j\|^2 + \|y_{k-1}^j\|^2)$Id.

The output of the scaling module 323 is a therefore a vector of scaled observations $\hat{y}_k$ of size n.

The de-interleaving module 324 receives the vector of scaled observations $\hat{y}_k$ and inverse the interleaving performed by the interleaving module 222 to generate a vector of processed observations $y'_k$ of size n.

As can be seen from the above, the scaling module 323 applies a scaling step to each vector of intermediate observations $\check{y}_k$. An objective of the scaling step is to obtain processed observations $y'_k(u)$ with equal noise variance (for example equal to 1) to facilitate the reconstruction of the vectors of decoded information bits $\tilde{w}_k$ by the IBICM module 34.

A scaling factor to be associated with the j-th PN-DSTBC module at iteration k in order to obtain a noise variance equal to 1 is given by the following equation:

$$\gamma_k^j = \frac{1}{\sqrt{\|x_k^j\|^2\|h^j\|^2 + \|y_{k-1}^j\|^2}} \quad (4)$$

This leads to the following definition of the scaled equivalent channel model $\hat{h}^j$:

$$\hat{h}^j = \gamma_k^j \|h^j\|^2 \|x_{k-1}^j\|$$

As can be seen the scaled equivalent channel model $\hat{h}^j$ depends on a norm $\|x_{k-1}^j\|$ of the couple of interleaved symbols $x_{k-1}^j$ provided to the j-th PN-DSTBC coder at iteration k−1. Obtaining an approximation of the norm $\|x_{k-1}^j\|$ is feasible on the receiver device 3. However, it has a strong impact on reconstructions performances. Indeed, first, the receiver device is only capable of obtaining an approximation of the norm $\|x_{k-1}^j\|$. Using such approximation induces error propagation in the reconstruction process. Second, before reconstructing a vector of observations $y_k$ at iteration k, the receiver device should wait for at least the result of the processing of a vector of observations $y_{k-1}$ at iteration k−1 by the signal decoding module 322 and the scaling module 323 to obtain the norm $\|x_{k-1}^j\|$. Waiting the processing of a vector of observations of a previous iteration induces latencies in the reconstruction process. Some communication systems, such as for instance the communication system 1 don't admit any latency nor error propagation in the reconstruction process.

Solutions are needed to design a reconstruction process avoiding error propagation and latencies.

It can be further noted that the scaling factor $\gamma_k^j$ and the scaled equivalent channel model $\hat{h}^j$ depend on a norm $\|x_k^j\|$ of the couple of interleaved symbols $x_k^j$ provided to the j-th PN-DSTBC coder at iteration k. The norm $\|x_k^j\|$ is not available on the receiver device 3. Indeed, as a reminder, the norm $\|x_k^j\|$ is the norm of a couple $x_k^j$ of a vector of interleaved symbols $x_k$. The vector of interleaved symbols $x_k$ depends directly of the vector of modulated symbols $z_k$ which is not known on the receiver device 3.

One solution to overcome this issue is to envisage each possible vector of modulated symbols $z_k$ on the receiver device 3 and to deduce a vector of interleaved symbols $x_k$ from each possible vector of modulated symbols $z_k$. Each deduced vector of interleaved symbols $x_k$ can then be divided in couples of interleaved symbols $x_k^j$. Then the receiver device 3 can compute a vector of scaling factors $\gamma_k$ of size n combining the scaling factors $\gamma_k^j$ and a vector of scaled equivalent channel models $\hat{h}$ of size n combining the scaled equivalent channel models $\hat{h}^j$ for each possible vector of modulated symbols $z_k$. However, computing on the receiver device 3 a vector of scaling factors $\gamma_k$ and a vector of scaled equivalent channel models $\hat{h}$ for each possible vector of modulated symbols $z_k$ has a high computation complexity.

Solutions are also needed to design a reconstruction process having a reasonable computation complexity.

Figure 7:
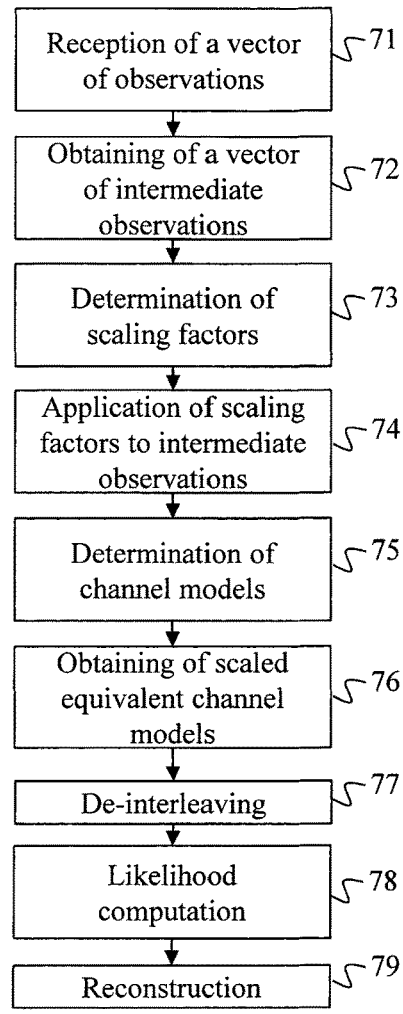
FIG. 7 illustrates schematically a reconstruction process according to the invention.

FIG. 7 illustrates schematically a reconstruction process according to the invention.

The reconstruction process described in relation to FIG. 7 is applied by the receiver device 3. This reconstruction process is an iterative reconstruction process in which a vector of observations $y_k$ corresponding to a vector of transmission symbols $s_k$ is processed in each iteration k.

In a step 71, the receiver device 3 receives on its communication interface 305 a vector of observations $y_k$.

In a step 72, the vector of observations $y_k$ is provided to the signal decoding module 322. From the vector of observations $y_k$ the signal decoding module 322 generates a vector of intermediate observations $\check{y}_k$.

In a step 73, the receiver device 3 determines at least one vector of approximated scaling factors $\gamma_k^A$. In other words the receiver device 3 determines for each inverse PN-DSTBC module of the signal decoding module 322, at least one approximated scaling factor $\gamma_k^{jA}$.

In an embodiment of step 73 in which high computation complexity is admitted, the receiver device 3 determines a vector of approximated scaling factors $\gamma_k^A$ combining approximated scaling factors $\gamma_k^{jA}$ associated to each inverse PN-DSTBC module of the signal decoding module 322 for each possible vector of modulated symbols $z_k$ applying equation (3).

Figure 8A:
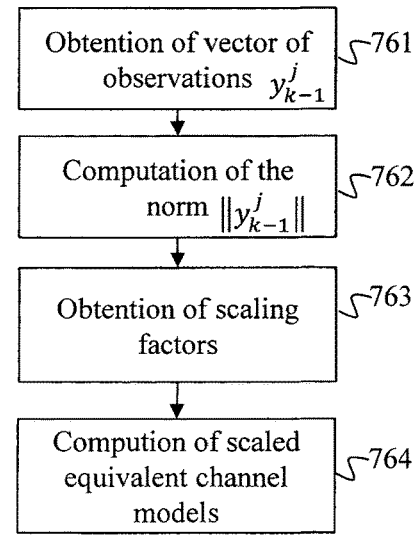
FIG. 8A illustrates schematically a computation of an approximated scaled equivalent channel model based on a first approximation.
Figure 8B:
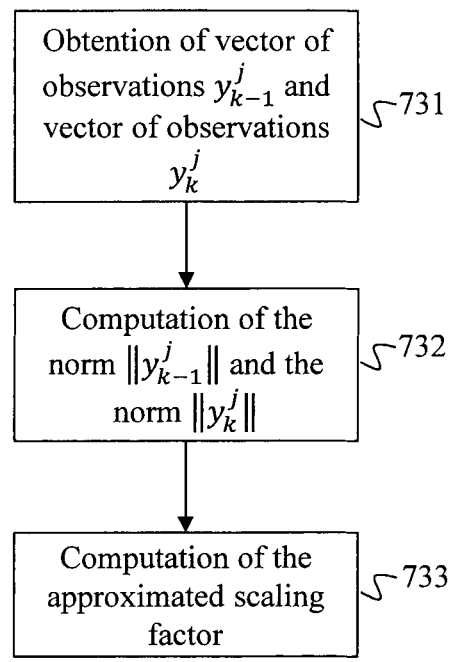
FIG. 8B illustrates schematically a computation of an approximated scaling factor based on the first approximation and on a second approximation.

In an embodiment of step 73 providing low computation complexity, one vector of approximated scaling factors $\gamma_k^A$ is determined using a process described in relation with FIG. 8B.

In an embodiment, the determined vector of approximated scaling factors $\gamma_k^A$ is stored in the receiver device 3 storage means 304.

In a step 74, the receiver device 3 applies the scaling step on the vector of intermediate observations $\check{y}_k$ to obtain, for each vector of approximated scaling factors $\gamma_k^A$, a vector of scaled observations $\hat{y}_k$ by using the scaling module 323.

In the embodiment in which high computation complexity is admitted, since a vector of approximated scaling factors $\gamma_k^A$ has been determined for each possible vector of modulated symbols $z_k$, a vector of scaled observations $\hat{y}_k$ is determined for each possible vector of modulated symbols $z_k$.

In an embodiment each determined vector of scaled observations $\hat{y}_k$ is stored in the receiver device 3 storage means 304.

In a step 75, the receiver device 3 determines a channel model $h^j$ for each couple of observations $y_k^j$.

In a step 76, the receiver device 3 determines a vector of approximated scaled equivalent channel models $\hat{h}_k^A$ for each vector of approximated scaling factors $\gamma_k^A$. Each vector of approximated scaled equivalent channel models $\hat{h}_k^A$ combines approximated scaled equivalent channel models determined for each inverse PN-DSTBC module of the signal decoding module 322. Each approximated scaled equivalent channel model $\hat{h}_k^{jA}$ is an approximation of an equivalent channel $h_k^j$ after processing by the j-th PN-DSTBC module and by the j-th elementary scaling module. In an embodiment of step 76, each approximated scaled equivalent channel model $\hat{h}_k^{jA}$ is determined using a process described hereafter in relation with FIG. 8A.

Figure 8C:
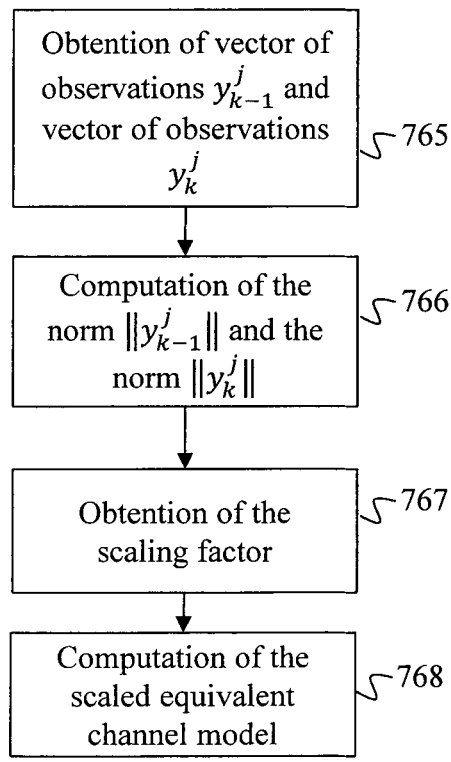
FIG. 8C illustrates schematically a computation of an approximated scaled equivalent channel model based on the first approximation and the second approximation.

In an embodiment of step 76, each approximated scaled equivalent channel model $\hat{h}_k^{jA}$ is determined using a process described hereafter in relation with FIG. 8C.

In a step 77, the receiver device 3 uses the de-interleaving module 324 to inverse the interleaving performed by the interleaving module 222. The vector of processed observations $y'_k$ is obtained as follows:

$$y'_k(\Omega(u)) = \hat{y}_k(\omega(u))$$

In order to obtain, for each processed observation of the vector of processed observations $y'_k$, an approximated scaled equivalent channel model consistent with said processed observations, a de-interleaving is also applied to each vector of approximated scaled equivalent channel model $\hat{h}_k^A$ as follows:

$$\delta_k(\Omega(u)) = \hat{h}_k^A(\omega(u))$$

where $\delta_k(u)$ is an approximated scaled equivalent channel model associated with the processed observation $y'_k(u)$.

In a step 78, the receiver device 3 uses the likelihood estimator module 33 to determine likelihoods in the form of values representative of joint probabilities $p(y_k|z_k, h)$ of obtaining a vector of observations $y_k$ knowing a vector of modulated symbols $z_k$ and the model h of the wireless channel 4. From the above, in the embodiment wherein the diversity creation module 22 comprises the LPC coder module 221, the following equation can be written:

$$z'_k = \Phi z_k$$

The following equation of a channel model is obtained for the vector of processed observations $y'_k$:

$$y'_k = \Delta_k \Phi z_k + \eta'_k \qquad (5)$$

where $\Delta_k$ represents a vector of approximated scaled equivalent channel models derived from a vector of approximated scaled equivalent channel models $\hat{h}_k^A$ such that:

$$\Delta_k = \text{diag}(\delta_k(n), \ldots, \delta_k(n))$$

and where it is considered that $\eta'_k$ is a white Gaussian noise with identity covariance matrix. Each vector of approximated scaled equivalent channel models $\Delta_k$ is therefore an approximation of the model h of the wireless channel 4 after processing by the signal decoding module 322, the scaling module 323 and the de-interleaving module 324.

Thus, the channel model of equation (11) is a well-known channel model for which a likelihood can be written as a joint probability of obtaining the vector of processed observations $y'_k$ knowing information representative of a vector of modulated symbols (for instance $z_k$) and a vector of approximated scaled equivalent channel $\Delta_k$:

$$p(y'_k \| z_k, \Delta_k) \propto \exp(-\|y'_k - \Delta_k \Phi z_k\|^2/2)$$

where $a \propto b$ indicates that variable a is proportional to variable b.

A joint probability $p(y'_k \| z_k, \Delta_k)$ can be determined by the receiver device 3 for each possible vector of modulated symbols $z_k$, provided that the receiver device 3 stores a list of all possible vectors of modulated symbols $z_k$ and for each possible vector of approximated scaled equivalent channel $\Delta_k$. In the embodiment in which high computation complexity is admitted, several vectors of approximated scaled equivalent channel $\Delta_k$ exist depending on the different values computed for the vector of approximated scaled equivalent channel models $\hat{h}_k^A$ in step 76 and the different values of the vector of approximated scaling factors $\gamma_k^A$ computed in step 73. In another low complexity embodiment described in the following, only one vector of approximated scaled equivalent channel $\Delta_k$ exists.

In an embodiment adapted to hard decoding, the vector of modulated symbols $z_k$ maximizing the likelihood is provided to the IBICM module 34.

In an embodiment adapted to soft decoding, the likelihoods are provided to the IBICM module 34.

We can remark that, when $\Delta_k \Phi$ is a block diagonal matrix, the computation of the likelihoods can be split into smaller problems associated to each block of said block diagonal matrix.

In a step 79, the receiver device 3 uses the determined likelihood to reconstruct a vector of decoded information bits $\tilde{w}_k$ using the IBICM module 34.

In an embodiment, only one vector of approximated scaling factor $\gamma_k^A$ is determined during step 73 using a process described in relation with FIG. 8B. In this embodiment, only one vector of scaled equivalent channel models $\hat{h}_k^j$ is determined during step 76 using a process described hereafter in relation with FIG. 8C.

In order to design a reconstruction process avoiding error propagation and latencies and having a reasonable computation complexity, the receiver device 3 can apply approximations.

By introducing equation (1) in equation (2) we obtain the following equation of a channel model for each couple of observations $y_k^j$:

$$y_k^j = Q(x_k^j) \frac{y_{k-1}^j - \eta_{k-1}^j}{\|y_{k-1}^j - \eta_{k-1}^j\|} \|h^j\| + \eta_k^j$$

The term $$\frac{y_{k-1}^j - \eta_{k-1}^j}{\|y_{k-1}^j - \eta_{k-1}^j\|}$$

of the previous equation is approximated as follows:

$$\frac{y_{k-1}^j - \eta_{k-1}^j}{\|y_{k-1}^j - \eta_{k-1}^j\|} \cong \beta_{k,1}^j \frac{y_{k-1}^j}{\|y_{k-1}^j\|} + \beta_{k,2}^j \frac{\eta_{k-1}^j}{\|y_{k-1}^j\|} \quad (6)$$

where $\beta_{k,1}^j$ and $\beta_{k,2}^j$ are predetermined parameters the determination of which is described in the following.

With the approximation (6) (called first approximation in the following) the couple of intermediate observations $\breve{y}_k^j$ can be written as follows:

$$\breve{y}_k^j = Q(y_k^j) Q(y_{k-1}^j)^\dagger [1\ 0]^T \cong \beta_{k,1}^j \|h^j\| \|y_{k-1}^j\| \|x_k^j\| -$$

$$\beta_{k,2}^j \|h^j\| Q(x_k^j) Q(\eta_{k-1}^{j'}) \frac{Q(y_{k-1}^j)^\dagger}{\|y_{k-1}^j\|} [1\ 0]^T + Q(\eta_{k-1}^{j'}) Q(y_{k-1}^j)^\dagger [1\ 0]^T$$

The predetermined parameters $\beta_{k,1}^j$ and $\beta_{k,2}^j$ can be obtained by an optimization consisting in a minimization of a quadratic error f $(\beta_{k,1}^j, \beta_{k,2}^j)$:

$$f(\beta_{k,1}^j, \beta_{k,2}^j) = E\left[\left\|\frac{y_{k-1}^j - \eta_{k-1}^j}{\|y_{k-1}^j - \eta_{k-1}^j\|} - \beta_{k,1}^j \frac{y_{k-1}^j}{\|y_{k-1}^j\|} - \beta_{k,2}^j \frac{\eta_{k-1}^j}{\|y_{k-1}^j\|}\right\|^2\right]$$

where E[x] is a mathematical expectation of a variable x.

The minimization of the quadratic error f $(\beta_{k,1}^j, \beta_{k,2}^j)$ leads to $$\beta_{k,1}^j = E\left[\Re\left(\frac{y_{k-1}^j}{\|y_{k-1}^j\|}\left(\frac{y_{k-1}^j - \eta_{k-1}^j}{\|y_{k-1}^j - \eta_{k-1}^j\|}\right)\right)\right]$$

$$\beta_{k,1}^j = \frac{\|y_{k-1}^j\|^2}{E[\|\eta_{k-1}^j\|^2]}\beta_{k,1}^j - E\left[\frac{\|y_{k-1}^j - \eta_{k-1}^j\|}{\|y_{k-1}^j\|}\right]$$

where $\Re(x)$ takes the real part of the variable x.

With the first approximation (4) the noise associated with the couple of intermediate observations $\breve{y}_k^j$ is Gaussian with variance:

$$\beta_{k,2}^{j^2} \|h^j\|^2 \|x_k^j\|^2 + \|y_{k-1}^j\|^2$$

This variance leads to:

$$\begin{cases} \gamma_k^{jA} = \dfrac{1}{\sqrt{\beta_{k,2}^{j2}\|h^j\|^2\|x_k^j\|^2 + \|y_{k-1}^j\|^2}} \\ \hat{h}_k^{jA} = \gamma_k^{jA} \beta_{k,1}^j \|h^j\| \|y_{k-1}^j\| \end{cases} \quad (7)$$

$$\quad (8)$$

Thus, with the first approximation (6), the approximated scaling factor $\gamma_k^A$ of equation (7) and the approximated scaled equivalent channel model $\hat{h}_k^A$ of equation (8) are independent of the norm $\|x_{k-1}^j\|$, which avoids creating latencies and error propagation in the reconstruction process with a small impact on the performance of the reconstruction process.

It can be noted that the approximated scaling factor $\gamma_k^A$ of equation (7) and the approximated scaled equivalent channel model $\hat{h}_k^A$ of equation (8) depend on the norm $\|x_k^j\|$ of a couple of interleaved symbols $x_k^j$ which, as we have seen above, depend of a the vector of modulated symbols $z_k$ which is not available on the receiver device 3. As already seen above, one solution to overcome this issue is to consider each possible vector of modulated symbols $z_k$. However, considering each possible vector of modulated symbols $z_k$ induces a high computation complexity.

A second approximation allows avoiding this high computation complexity. In this second approximation the term $\|h^j\|^2 \|x_k^j\|^2$ approximated by $\|y_k^j\|^2$:

$$\|h^j\|^2 \|x_k^j\|^2 = \|y_k^j\|^2$$

which leads to $$\begin{cases} \gamma_k^{j^A} = \dfrac{1}{\sqrt{\beta_{k,2}^{j^2}\|y_k^j\|^2 + \|y_{k-1}^j\|^2}} & (10) \\ \hat{h}_k^{j^A} = \gamma_k^{j^A} \beta_{k,1}^j \|h^j\| \|y_{k-1}^j\| & (11) \end{cases}$$

Thus, with the first approximation (6) and the second approximation (9), the approximated scaling factor $\gamma_k^{j^A}$ and the approximated scaled equivalent channel model $\hat{h}_k^{j^A}$ are independent of $\|_{k-1}^j\|$ and $\|x_k^j\|$ which first, avoid creating latencies and error propagation in the reconstruction process, and second, reduce the complexity of the reconstruction process, with a small impact on the performance of the reconstruction process.

FIG. 8A illustrates schematically a computation of approximated scaled h equivalent channel models $\hat{h}_k^{j^A}$ based on the first approximation (6).

FIG. 8A describes a first example of a process corresponding to step 76 in the embodiment in which high computation complexity is admitted. The process described in relation with FIG. 8A is applied for each inverse PN-DSTBC module.

In step 761 the receiver device 3 obtains a couple of observations $y_{k-1}^j$ corresponding to an iteration k−1 of the reconstruction process preceding the current iteration k. The couple of observations $y_{k-1}^j$ has been stored for instance in the storage means 304 of the receiver device 3.

In a step 762 the receiver device 3 computes a norm $\|y_{k-1}^j\|$ of the couple $y_{k-1}^j$.

In a step 763 the receiver device 3 obtains the approximated scaling factors $\gamma_k^{j^A}$ computed for the j-th inverse PN-DSTBC module for each possible vector of modulated symbols $z_k$ at step 73 from the storage means 304.

In a step 764 the receiver device 3 computes an approximated scaled equivalent channel model $\hat{h}_k^{j^A}$ for the j-th inverse PN-DSTBC module for each possible vector of modulated symbols $z_k$ injecting the scaling factors $\gamma_k^{j^A}$ obtained in step 763 in equation (8).

FIG. 8B illustrates schematically a computation of an approximated scaling factor based on the first approximation (6) and on the second approximation (9).

FIG. 8B describes a process corresponding to step 73 in which only one approximated scaling factor $\gamma_k^{j^A}$ is computed for each inverse PN-DSTBC module. This embodiment benefits of the first approximation (6) and the second approximation (9). This embodiment is a low complexity embodiment since it is not necessary to consider each possible vector of modulated symbols $z_k$ since $\gamma_k^{j^A}$ is independent of the couple of interleaved symbols $x_k^j$ and consequently independent of vector of modulated symbols $z_k$. The process described in relation with FIG. 8B is applied for each inverse PN-DSTBC module.

In a step 731 the receiver device 3 obtains a couple of observations $y_{k-1}^j$ corresponding to an iteration k−1 of the reconstruction process preceding the current iteration k and a couple of observations $y_k^j$ corresponding to the current iteration k.

In a step 732 the receiver device 3 computes a norm $\|y_{k-1}^j\|$ of the couple $y_{k-1}^j$ and a norm $\|y_k^j\|$ of the couple $y_k^j$.

In a step 733 the receiver device 3 computes the scaling factor $\gamma_k^{j^A}$ using equation (9).

FIG. 8C illustrates schematically a computation of an approximated scaled equivalent channel model $\hat{h}_k^{j^A}$ based on the first approximation (6) and the second approximation (9).

Fig. 8C describes a second example of a process corresponding to step 76 in the low complexity embodiment. The process described in relation with FIG. 8C is applied for each inverse PN-DSTBC module.

In a step 765 the receiver device 3 obtains a couple of observations $y_{k-1}^j$ corresponding to an iteration k−1 of the reconstruction process preceding the current iteration k and a couple of observations $y_k^j$ corresponding to the current iteration k. The couples of observations $y_{k-1}^j$ and $y_k^j$ have been stored for instance in the storage means 304 of the receiver device 3.

In a step 766 the receiver device 3 computes a norm $\|y_{k-1}^j\|$ of the couple $y_{k-1}^j$ and a norm $\|y_k^j\|$ of the couple $y_k^j$.

In a step 767 the receiver device 3 obtains the approximated scaling factors $\gamma_k^{j^A}$ computed at step 73 when applying the process of FIG. 8B from the storage means 304.

In a step 768 the receiver device 3 computes the scaled equivalent channel model injecting the scaling factors $\gamma_k^{j^A}$ obtained in step 767 in equation (11).

In an embodiment, steps 766 and 767 reuse respectively the results of steps 731 and 732.

In an embodiment of the processes described in relation with FIGS. 8A, 8B and 8C, the predetermined parameters $\beta_{k,1}^j$ and) $\beta_{k,2}^j$ are computed offline in function of $y_{k-1}^j$ and tabulated.

In an embodiment of the processes described in relation with FIGS. 8A, 8B and 8C, the predetermined parameters $\gamma_{k,1}^j$ and $\beta_{k,2}^j$ are approximated with an asymptotic assumption that $\|y_{k-1}^j\| \gg \|\eta_{k-1}^j\|$ (i.e. the noise $\eta_{k-1}^j$ is negligible comparing to the received observations $y_{k-1}^j$). In that case $\beta_{k,1}^j = 1$ and $\beta_{k,2}^j = -0.75$.

In an embodiment of the processes described in relation with FIGS. 8A, 8B and 8C, the predetermined parameters $\beta_{k,1}^j$ and $\beta_{k,2}^j$ are fixed to $\beta_{k,1}^j 1$ and $\beta_{k,2}^j = -1$.

The description above describes several embodiments of the invention focusing on a communication system in which the receiver device comprises one reception antenna and the signal encoding module 223 comprises parallel PN-DSTBC coders. The principles of the invention can be adapted however to a broader context.

For instance, the invention applies to a receiver device comprising a plurality of reception antennas. In that case, at each iteration k of the reconstruction process, the receiver device receives a plurality of vectors of observations $y_k^r$ corresponding to a same vector of transmission symbols, the variable r corresponding to a r-th antenna, with $r \in [1; N_r]$ and $N_r$ being a number of antennas on the receiver device 3 ($N_r > 1$). Consequently each inverse PN-DSTBC module processes r couples of observations $y_k^{j,r}$ and generates r couples of intermediate observations $\check{y}_k^{j,r}$. Each elementary scaling module processes r couples of intermediate observations $\check{y}_k^{j,r}$ and generates r couples of scaled observations $\hat{y}_k^{j,r}$, at least one approximated scaling factor $\gamma_k^{j,r^A}$ being computed for each couples of intermediate observations $\check{y}_k^{j,r}$ applying the method described in relation with FIGS. 8A, 8B and 8C.

From a set of r couples of scaled observations $\hat{y}_k^{j,r}$ corresponding to the j-th inverse PN-DSTBC module, the receiver device 3 generates a couple of scaled observations $\hat{y}_k^j$ as follows:

$$\hat{y}_k^j = \frac{1}{N_r} \sum_{r=1}^{N_r} \hat{y}_k^{j,r}$$

In parallel to the obtaining of the couples of scaled observations $\hat{y}_k^j$, the receiver device 3 determines, for each vector of observations $y_k^j$, at least one approximated scaled equivalent channel model $\hat{h}_k^{j,r^A}$ for each inverse PN-DSTBC module as described in relation with step 76 and FIG. 8A or 8C. Then the receiver device 3 determines for each inverse PN-DSTBC module at least one global approximated scaled equivalent channel model $\hat{h}_k^{j^A}$ as follows:

$$\hat{h}_k^{j^A} = \frac{1}{N_r} \sum_{r=1}^{N_r} \hat{h}_k^{j,r^A}$$

A global vector of approximated scaled equivalent channel model $\hat{h}_k^A$ being determined for each possible vector of modulation symbols $z_k$ in the high computation complexity mode while only one global vector of approximated scaled equivalent channel model $\hat{h}_k^A$ being determined in the low complexity mode.

The couples of scaled observations $\hat{y}_k^j$ are then provided to the de-interleaving module and the reconstruction process described in relation with FIG. 7 continues with steps 77, 78 and 79 considering the following equation of channel model:

$$\hat{y}_k^j = \hat{h}^j x_k^j + \frac{1}{N_r} \sum_{r=1}^{N_r} \hat{\eta}_k^{j,r}$$

assuming that $$\frac{1}{N_r} \sum_{r=1}^{N_r} \hat{\eta}_k^{j,r}$$

is an equivalent noise having an identity covariance matrix.

The invention applies also to a communication system in which the diversity creation module 22 of the transmission device 2 comprises a signal encoding module 223 based on parallel PN-DSFBC coders and the inverse diversity creation module 32 of the receiver device 3 comprises a signal decoding module 322 based on parallel inverse PN-DSFBC modules.

The invention claimed is:

1. A method for computing likelihoods in a process for reconstructing decoded information words from a signal received on a receiver device in the form of vectors of observations after transmission of said signal using sub-channels of a wireless channel by a transmission device in the form of vectors derived from vectors of modulated symbols, said signal having been generated using a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, the receiver device comprising at least one reception antenna, a signal decoding module, a scaling module adapted to scale observations of a vector of observations after processing by the signal decoding module to obtain a vector of scaled observations and a de-interleaving module applying a de-interleaving to the vector of scaled observations, the signal decoding module comprising elementary decoding modules, each elementary decoding module being an inverse DSTBC or inverse DSFBC module, characterized in that the method comprises applying an iterative reconstruction process, comprising in a current iteration:

receiving a vector of observations on each antenna, each vector of observations corresponding to a same vector of modulated symbols;

determining, for each vector of observations, at least one corresponding vector of approximated scaling factors;

determining for each vector of approximated scaling factors corresponding to each vector of observations, a vector of approximated scaled equivalent channel models; and, computing likelihoods in the form of values representative of joint probabilities of obtaining each vector of observations knowing a vector of modulated symbols and a model of the wireless channel using each determined vector of approximated scaling factors and each determined vector of approximated scaled equivalent channel models;

wherein the determining, of one vector of approximated scaled equivalent channel models, comprises for each elementary decoding module, the sub steps of computing a norm, called first norm, of a couple of observations of a preceding vector of observations received on the same antenna than said vector of observations in an iteration preceding the current iteration, said couple of observations corresponding to the elementary decoding module;

obtaining an approximated scaling factor of the vector of approximated scaling factors corresponding to the elementary decoding module; and, computing an approximated scaled equivalent channel model as a product of said approximated scaling factor, said first norm, a norm of channel coefficients of the model of the wireless channel corresponding to said elementary decoding module and a first predetermined parameter corresponding to said elementary decoding module.

2. A method according to claim 1 characterized in that, each vectors derived from vectors of modulated symbols is a vector of transmission symbols and each transmission symbol of the vector of transmission symbols is transmitted on a different sub-channel of the wireless channel.

3. A method according to claim 1 characterized in that, said signal have been generated using also an interleaving module positioned before the plurality of elementary coding modules and interleaving a vector of modulated symbols to generate a vector of interleaved symbols provided to the plurality of elementary coding modules, the de-interleaving applied by the de-interleaving module corresponding to the interleaving performed by the interleaving module.

4. A method according to claim 1 characterized in that, the vector of scaled observations obtained by the scaling module comprises scaled observations with equal noise variance.

5. A method according to claim 1 characterized in that, a vector of scaled observations is obtained by the scaling module for each vector of approximated scaling factors.

6. A method according to claim 1 characterized in that, each vector of approximated scaled equivalent channel models is representative of an approximation of the model of the wireless channel after processing by the signal decoding module, the scaling module and the de-interleaving module.

7. A method according to claim 1 characterized in that a vector of approximated scaling factors and a vector of approximated scaled equivalent channel models are determined for each possible vector of modulated symbols.

8. A method according to claim 1 characterized in that, determining, for a vector of observations, at least one corresponding vector of approximated scaling factors comprises, for an elementary decoding module:
    computing a norm, called second norm, of a couple of observations of said vector of observations corresponding to the elementary decoding module;
    computing one approximated scaling factor, called single approximated scaling factor, as a division of the value one by a square root of a sum of a first element and a second element, the first element being a product of a square of second predetermined parameter corresponding to said elementary decoding module and a square of the second norm and the second element being a square of the first norm.

9. A method according to claim 8 characterized in that the approximated scaling factor used when computing the approximated scaled equivalent channel model as a product of said approximated scaling factor, said first norm, said norm of channel coefficients of the model of the wireless channel and said first predetermined parameter, is the single approximated scaling factor.

10. A method according to claim 8 characterized in that, the second predetermined parameter corresponding to said elementary decoding module is fixed to the value "−1".

11. A method according to claim 1 characterized in that, each predetermined parameter corresponding to said elementary decoding module is computed in function of the couple of observations of the preceding vector of observations corresponding to said elementary decoding module.

12. A method according to claim 1 characterized in that, each predetermined parameter corresponding to said elementary decoding module is computed in function of the couple of observations of the preceding vector of observations corresponding to said elementary decoding module with an asymptotic assumption that the first norm is much higher than a norm of a noise associated with the channel coefficients of the approximated scaled equivalent channel model corresponding to said elementary decoding module.

13. A method according to claim 1 characterized in that, the first predetermined parameter corresponding to said elementary decoding module is fixed to the value "1".

14. A non-transitory computer readable medium having stored thereon a computer program comprising program code instructions which can be loaded in a programmable device for implementing the method according to claim 1, when the program code instructions are run by the programmable device.

15. A receiver device for computing likelihoods in a process for reconstructing decoded information words from a signal received in the form of vectors of observations after transmission of said signal using sub-channels of a wireless channel by a transmission device in the form of vectors derived from vectors of modulated symbols, said signal having been generated using a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, said receiver device comprising at least one reception antenna, a signal decoding module, a scaling module adapted to scale observations of a vector of observations after processing by the signal decoding module to obtain a vector of scaled observations and a de-interleaving module adapted to apply a de-interleaving to the vector of scaled observations, the signal decoding module comprising elementary decoding modules, each elementary decoding module being an inverse DSTBC or inverse DSFBC module, characterized in that the receiver device comprises means for applying an iterative reconstruction process adapted to in a current iteration:
    receive a vector of observations on each antenna, each vector of observations corresponding to a same vector of modulated symbols;
    determine, for each vector of observations, at least one corresponding vector of approximated scaling factors;
    determine for each vector of approximated scaling factors corresponding to each vector of observations, a vector of approximated scaled equivalent channel models; and,
    compute likelihoods in the form of values representative of joint probabilities of obtaining each vector of observations knowing a vector of modulated symbols and a model of the wireless channel using each determined vector of approximated scaling factors and each determined vector of approximated scaled equivalent channel models;
    wherein for determining one vector of approximated scaled equivalent channel models, the iterative reconstruction process is adapted to
        compute a norm, called first norm, of a couple of observations of a preceding vector of observations received on the same antenna than said vector of observations in an iteration preceding the current iteration, said couple of observations corresponding to an elementary decoding module;
        obtain an approximated scaling factor of the vector of approximated scaling factors corresponding to said elementary decoding module; and,
        to compute an approximated scaled equivalent channel model as a product of said approximated scaling factor, said first norm, a norm of channel coefficients of the model of the wireless channel corresponding to said elementary decoding module and a first predetermined parameter corresponding to said elementary decoding module.

16. System of communication comprising a transmission device adapted to transmit a signal on a wireless channel in the form of vectors of transmission symbols derived from vectors of modulation symbols, said transmission device comprising a diversity creation module comprising an interleaving module and a signal encoding module comprising a plurality of elementary coding modules, an elementary coding module being an Alamouti matrix based Differential Space Time Block Codes coder, called DSTBC coder, or an Alamouti matrix based Differential Space Frequency Block Codes coder, called DSFBC coder, each transmission symbol of the vector of transmission symbols having been transmitted on a different sub-channel of the wireless channel and a receiver device according to claim 15.

* * * * *